(12) United States Patent
Behrens et al.

(10) Patent No.: US 9,963,295 B2
(45) Date of Patent: May 8, 2018

(54) BELT THAT IS CONTINUOUSLY CLOSED IN THE LONGITUDINAL DIRECTION, IN PARTICULAR ROUND BALER BELT

(71) Applicant: ContiTech Transportbandsysteme GmbH, Hannover (DE)

(72) Inventors: Carsten Behrens, Bilshausen (DE); Lysander Stange, Northeim (DE)

(73) Assignee: ContiTech Transportbandsysteme GmbH, Hannover (DE)

( * ) Notice: Subject to any disclaimer, the term of this patent is extended or adjusted under 35 U.S.C. 154(b) by 0 days. days.

(21) Appl. No.: 15/185,645

(22) Filed: Jun. 17, 2016

(65) Prior Publication Data
US 2017/0001803 A1    Jan. 5, 2017

(30) Foreign Application Priority Data
Jul. 3, 2015   (DE) .......................... 10 2015 212 480

(51) Int. Cl.
*B65G 15/34*       (2006.01)
*B32B 5/02*        (2006.01)
(Continued)

(52) U.S. Cl.
CPC ................ *B65G 15/34* (2013.01); *B32B 3/16* (2013.01); *B32B 3/18* (2013.01); *B32B 5/02* (2013.01); *B32B 2413/00* (2013.01)

(58) Field of Classification Search
CPC .............. B65G 15/34; B32B 3/16; B32B 3/15
(Continued)

(56) References Cited

U.S. PATENT DOCUMENTS 5,326,411 A * 7/1994 Arnold .................... A01F 15/07
                                                         156/137
2005/0072658 A1   4/2005 Nishikita
2010/0300849 A1  12/2010 Spence

FOREIGN PATENT DOCUMENTS

FR          1318725 A      2/1963
FR          1575376 A      7/1969

OTHER PUBLICATIONS

EP Search Report dated Aug. 11, 2016 of EP application 16 16 3616 claiming priority to DE 10 2015 212 480.0 on which this application is based.
(Continued)

*Primary Examiner* — Gene O Crawford
*Assistant Examiner* — Lester Rushin, III
(74) *Attorney, Agent, or Firm* — David L. Cate

(57) ABSTRACT

A belt, such as a round baler belt, includes an internal region, an external region, a core region arranged between the internal region and the external region, and at least one peripheral region arranged transversely to longitudinal direction of the round baler belt. The peripheral region is arranged at least partially between the internal region and the external region, and the belt is continuously closed in the longitudinal direction. The peripheral region may be arranged entirely between the internal region and the external region. In some cases, at least one peripheral region is two peripheral regions located opposite one another transversely to the longitudinal direction. Furthermore, the core region may be continuously wound, and even formed of reinforcing fabric. In some aspects, the internal region and/or the external region and/or a peripheral region and/or both peripheral regions contain an elastomeric material.

16 Claims, 3 Drawing Sheets

(51) Int. Cl.
*B32B 3/16* (2006.01)
*B32B 3/18* (2006.01)

(58) Field of Classification Search
USPC .................................. 198/844.1, 846, 847
See application file for complete search history.

(56) References Cited

OTHER PUBLICATIONS

DE Office action dated Feb. 24, 2016 of DE application 10 2015 212 480.0 on which this application is based.

* cited by examiner

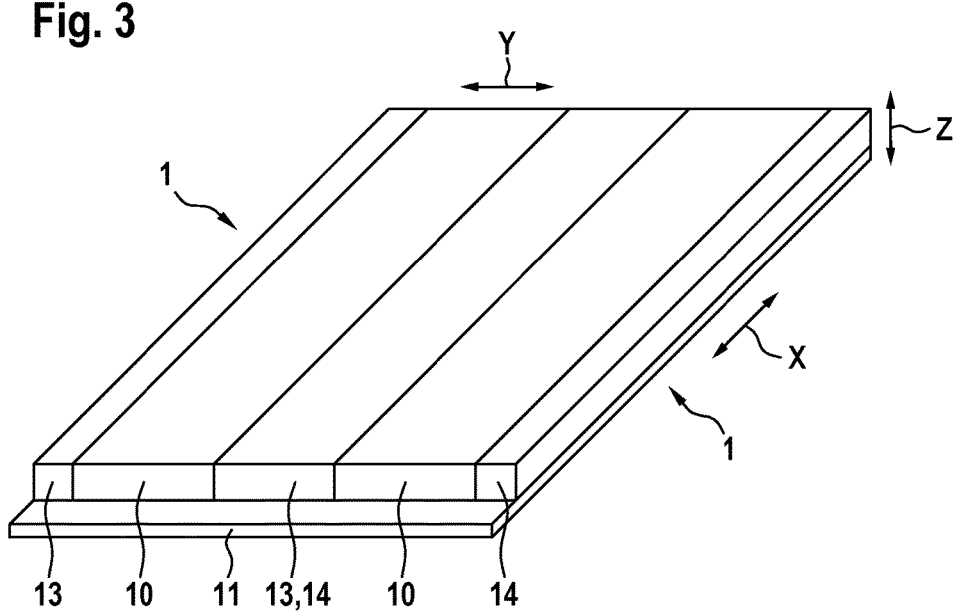
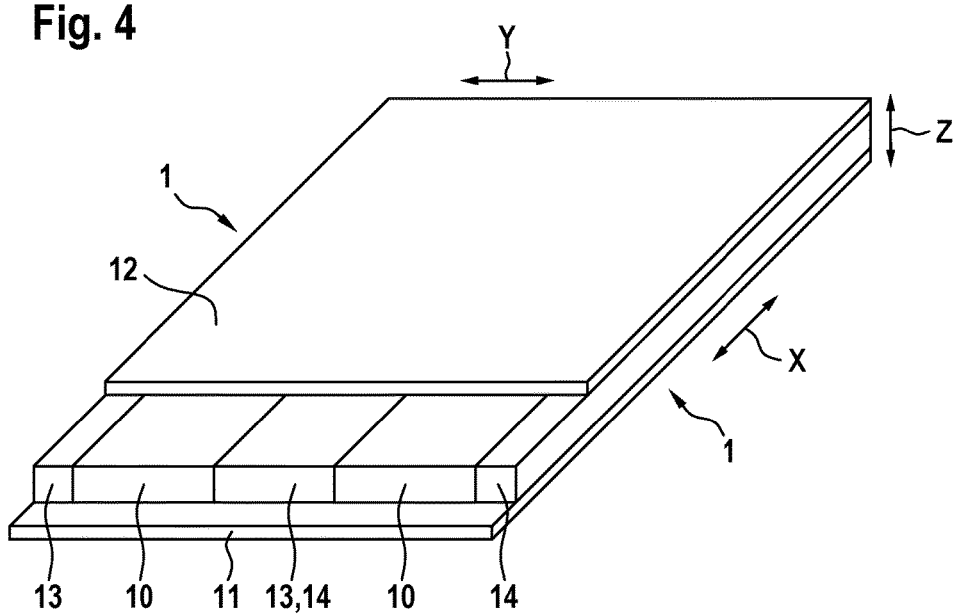

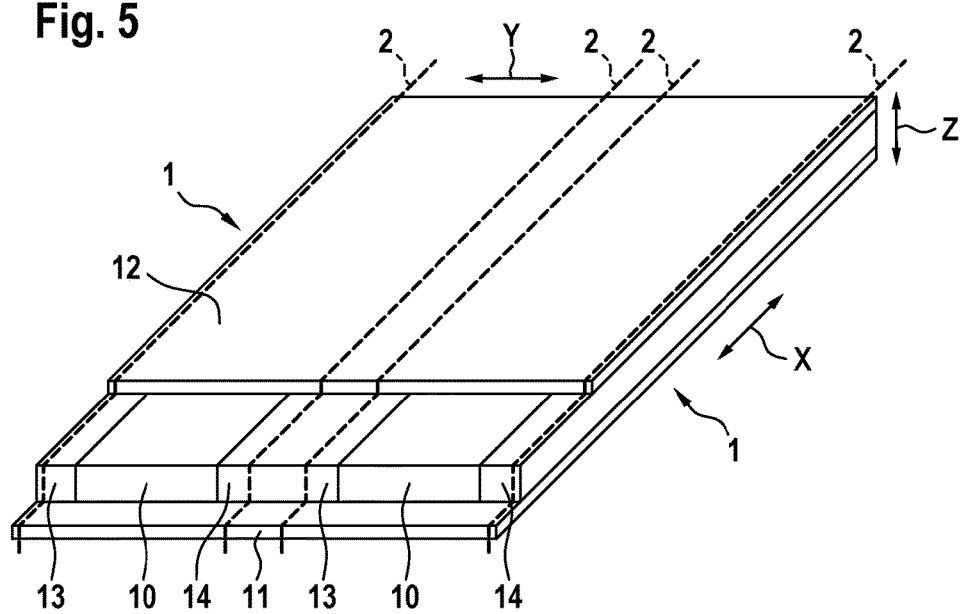
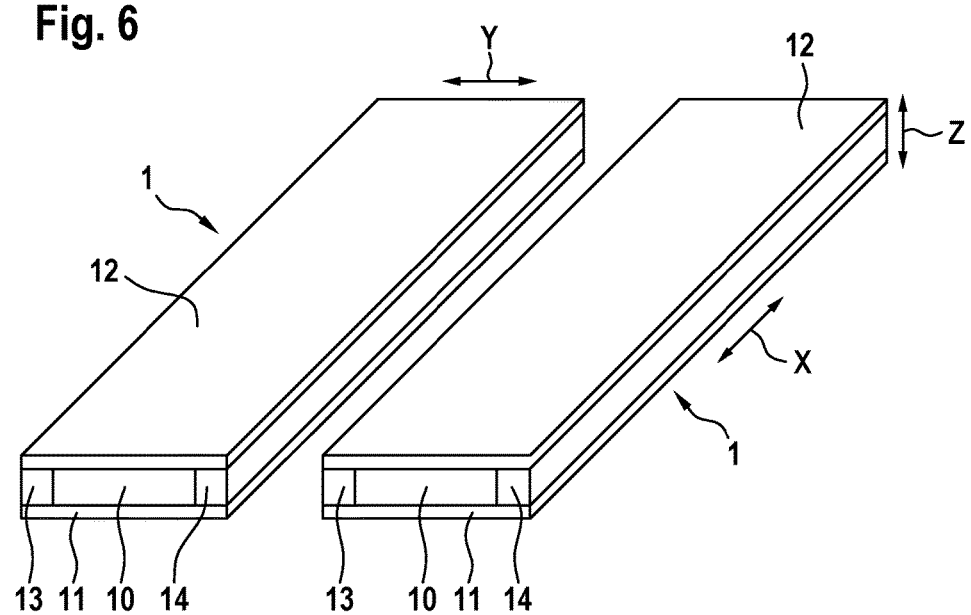

BELT THAT IS CONTINUOUSLY CLOSED IN THE LONGITUDINAL DIRECTION, IN PARTICULAR ROUND BALER BELT

CROSS REFERENCE TO RELATED APPLICATIONS

This application claims priority to German patent application number 10 2015 212 480.0, filed Jul. 3, 2015, and the entire content of this application is incorporated herein by reference.

FIELD

The disclosure relates to a belt that is continuously closed in the longitudinal direction, and in particular a round baler belt having several regions.

BACKGROUND

This section provides background information to facilitate a better understanding of the various aspects of the disclosure. It should be understood that the statements in this section of this document are to be read in this light, and not as admissions of prior art.

In many technical applications, continuously closed belts have been used for a long time. These can be for example drive belts, conveyor belts or round baler belts. These are usually produced in that a fabric carcass is manufactured as a core region from a fabric layer or a plurality of fabric layers. This core region is provided from the inside with an elastomeric running side and from the outside with an elastomeric carrying side (for example cover panel rubber). This arrangement can be cooled down freely in a press in the case of the vulcanization of rubber products. The (vulcanized) belt can then be cut to the desired width.

A disadvantage here is that, on account of the lateral cutting, the fabric of the core region is at least partially exposed and can be damaged by the cutting operation. The exposed fabric can therefore absorb moisture, with the result that undesired swelling of the fabric edges can occur, and this can lead to deformation of the belt. This can result in impaired running behaviour in the longitudinal direction. Furthermore, fabric threads of the fabric carcass can emerge laterally at the cut edges. This fraying can represent a visual defect. In addition, these frays can become entangled in other bodies and as a result be torn out of the edge of the fabric carcass, thereby causing damage to the cover panels.

DE 30 16 674 A1 discloses a baler belt for bale straps, which has a reinforcing fabric that extends in the longitudinal direction as a core. Cover panels are arranged above and below the reinforcing fabric. Edge strips are attached to both sides of the cleanly cut side edges of the baler belt, in order to cover the side edges and protect them from damage.

A disadvantage here is that the connection between the edge strips and the cleanly cut side edges of the baler belt already vulcanized beforehand has to be produced for example by adhesive. This type of cohesive connection has only limited durability and so the edge strips can tear off during use. As a result, they lose their protective action. Moreover, the width of the baler belt in the transverse direction changes as a result. In addition, the adhesive edges extend visibly on the running side and on the carrying side, and so nonuniform surfaces of the running side and carrying side form. This can result in changed running behaviour of the baler belt. Furthermore, in this way, the adhesive edges can be exposed to external influences and direct loads, and these can have a negative effect on the durability of the adhesive bond.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In a first aspect of the disclosure, a belt is provided which includes an internal region, an external region, a core region arranged between the internal region and the external region, and at least one peripheral region arranged transversely to longitudinal direction of the round baler belt. The peripheral region is arranged at least partially between the internal region and the external region, and the belt is continuously closed in the longitudinal direction. The peripheral region may be arranged entirely between the internal region and the external region. In some cases, at least one peripheral region is two peripheral regions located opposite one another transversely to the longitudinal direction. Furthermore, the core region may be continuously wound, and even formed of reinforcing fabric. In some aspects, the internal region and/or the external region and/or a peripheral region and/or both peripheral regions contain an elastomeric material.

In another aspect of the disclosure, a round baler belt includes an internal region, an external region, a core region arranged between the internal region and the external region, and two peripheral regions located opposite one another and arranged transversely to longitudinal direction of the round baler belt. The peripheral region is arranged entirely between the internal region and the external region, and the round baler belt is continuously closed in the longitudinal direction. The core region may be continuously wound, for example, using a reinforcing fabric. The internal region and/or the external region and/or a peripheral region and/or both peripheral regions may include an elastomeric material.

Yet another aspect of the disclosure is a method for producing a belt which is continuously closed in a longitudinal direction, the method including producing a continuously closed core region, and arranging an internal region against the core region from the inside, the internal region protruding beyond the core region transversely to the longitudinal direction. At least one peripheral region is arranged laterally adjacent the core region transversely to the longitudinal direction, and an external region arranged on the core region from the outside, where the external region protruding beyond the core region transversely to the longitudinal direction. The peripheral region is arranged at least partially between the internal region and the external region. In some aspects, the peripheral region is arranged entirely between the internal region and the external region.

The method may further include vulcanizing the belt, and in some aspects, even further includes separating the peripheral region and/or the internal region and/or the external region in the direction of the thickness (Z) of the belt, such that the peripheral region terminates flush with the internal region and/or with the external region transversely to the longitudinal direction.

In some embodiments, the at least one peripheral region is two peripheral regions located opposite one another transversely to the longitudinal direction. The core region may be continuously wound. Furthermore, the internal region and/or the external region and/or a peripheral region and/or both peripheral regions comprise an elastomeric material.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and:

FIG. 3 shows a perspective schematic illustration of a continuously closed belt according to the disclosure in a third production step;

FIG. 4 shows a perspective schematic illustration of a continuously closed belt according to the disclosure in a fourth production step;

FIG. 5 shows a perspective schematic illustration of a continuously closed belt according to the disclosure in a fifth production step; and FIG. 6 shows a perspective schematic illustration of a continuously closed belt according to the disclosure in a sixth production step.

DETAILED DESCRIPTION

Figure 1:
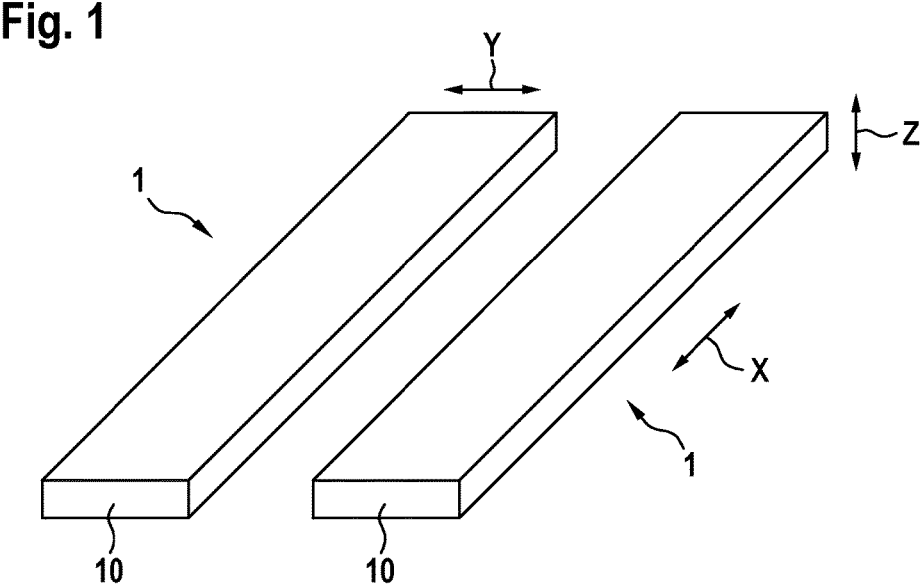
FIG. 1 shows a perspective schematic illustration of a continuously closed belt according to the disclosure in a first production step.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure.

It is an object of the embodiments according to the disclosure to provide a belt that is continuously closed in the longitudinal direction, in particular a round baler belt, of the type described at the beginning, wherein the core region can be protected better than has been known hitherto.

The object may be achieved according to the disclosure by a belt that is continuously closed in the longitudinal direction, in particular a round baler belt, having the features of an internal region, an external region, a core region arranged between the internal region and the external region, and at least one peripheral region arranged transversely to the longitudinal direction, where the peripheral region is arranged at least partially between the internal region and the external region.

Furthermore, the object may be achieved according to the disclosure by a method of producing a belt that is continuously closed in the longitudinal direction by steps of producing a continuously closed core region, arranging an internal region against the core region from the inside, where the internal region protrudes beyond the core region transversely to the longitudinal direction. At least one peripheral region is arranged laterally next to the core region and transversely to the longitudinal direction, and an external region is arranged on the core region from the outside, where the external region protrudes beyond the core region transversely to the longitudinal direction. The peripheral region is arranged at least partially between the internal region and the external region.

Thus, some embodiments according to the disclosure relate to a belt that is continuously closed in the longitudinal direction, in particular a round baler belt, having an internal region, an external region, and a core region arranged between the internal region and the external region. In this case "internal" and "external" should be understood as meaning in the direction of the thickness or height of the continuously closed belt, i.e. so to speak in the radial direction. The internal region represents the running side and the external region the carrying side in the case of a round baler belt. The continuously closed belt also has at least one peripheral region arranged transversely to the longitudinal direction, i.e. in the transverse direction. This peripheral region is arranged laterally with respect to the core region in terms of width.

In the continuously closed belt according to aspects of the disclosure, the peripheral region is arranged at least partially between the internal region and the external region. In other words, the internal region and the external region extend beyond the peripheral region in the transverse direction, such that they enclose the peripheral region as well as the core region between one another. In this case, the internal and external regions can enclose the peripheral region entirely or only partially in the direction of the transverse direction. In addition, the internal and the external region can enclose the peripheral region in each case to different extents in the transverse direction.

Here, embodiments are based on the finding that the core region can be protected laterally by the peripheral region and better attachment of the peripheral region to the rest of the belt can be created in that the peripheral region is covered at least partially by the internal and external regions from both sides (from above and from below). As a result, the better connection is created over a larger contact area. In addition, this contact area encloses the peripheral region from three sides, this likewise being able to increase the stability of this connection. As a result of this improved connection between the peripheral region and the rest of the belt, the peripheral region can exert its protective action better and for longer. In this case, embodiments are applicable to all types of continuously closed belts, for example drive belts, conveyor belts, round baler belts, and the like.

According to a further aspect of the disclosure, the peripheral region is arranged entirely between the internal region and the external region. In other words, the internal region and the external region and also the peripheral region extend over the same width in the transverse direction and thus terminate laterally flush with one another. As a result, a smooth and closed surface is produced in each case upwardly and downwardly, and this not only having a uniform appearance but also being able to exhibit uniform behaviour, for example with regard to the running properties. As a result of this, too, the connection between the peripheral region and core region is protected by the internal and external regions arranged thereunder and thereover, respectively. Furthermore, the action between the internal and external regions and the peripheral region can be maximized in this way in that the contact area between these regions is maximized.

According to a further aspect of the disclosure, the continuously closed belt has two peripheral regions located opposite one another transversely to the longitudinal direction. In this way, the above-described advantages of embodiments can be used at both lateral edges of the continuously closed belt. As a result, the continuously closed belt can also be constructed in a symmetrical manner.

According to a further aspect of the disclosure, the core region is continuously wound. As a result, a continuously closed belt can be produced without interruption in the longitudinal direction, and so a connecting point as a weak point can be avoided. Uniform transmission of tensile forces in the longitudinal direction can also be allowed.

According to a further aspect of the disclosure, the core region has a reinforcing fabric. This can allow or improve the transmission of tensile forces in the longitudinal direction. The reinforcing fabric can be formed in a single-ply or multi-ply manner.

According to a further aspect of the disclosure, the internal region and/or the external region and/or a peripheral region and/or both peripheral regions exhibit an elastomeric material, preferably consist of an elastomeric material. In this way, the elastic properties of the elastomeric material can be used in the continuously closed belt.

Some embodiments of the disclosure also relate to methods for producing a belt that is continuously closed in the longitudinal direction, as described above, having the steps of:
producing a continuously closed core region,
arranging an internal region against the core region from the inside, the internal region protruding beyond the core region transversely to the longitudinal direction,
arranging at least one peripheral region laterally next to the core region transversely to the longitudinal direction, and
arranging an external region on the core region from the outside, the external region protruding beyond the core region transversely to the longitudinal direction, such that the peripheral region is arranged at least partially between the internal region and the external region.

By means of the methods, continuously closed belts according to the disclosure can be produced easily and efficiently. In particular the construction of the belt from the inside to the outside allows good accessibility of the intermediate products for the individual method steps.

According to one aspect of the disclosure, the peripheral region is arranged entirely between the internal region and the external region. The advantages of this configuration have already been described above and will therefore not be repeated.

According to a further aspect of the disclosure, the method also has the additional step of vulcanizing the belt.

As a result, the above-described arrangement of the individual elements of the continuously closed belt according to the disclosure can be vulcanized jointly, such that a cohesive connection can be produced between all the elements.

According to a further aspect of the disclosure, the method also has the additional step of separating the peripheral region and/or the internal region and/or the external region in the direction of the thickness of the belt, such that the peripheral region terminates flush with the internal region and/or with the external region transversely to the longitudinal direction.

In this way, the vulcanized continuously closed belt can be cut to such a width that the internal and external regions reliably surround the core region and the peripheral region on both sides. Furthermore, the continuously closed belt can be cut to the desired width as a result. As a result, a smooth and straight lateral edge of the continuously closed belt can also be produced. This can be advantageous for the straight running of the continuously closed belt.

FIGS. 1 to 6 show perspective schematic illustrations of a continuously closed belt 1 according to the disclosure in a first to sixth production step.

The continuously closed belt 1 is a round baler belt 1 which extends substantially in the longitudinal direction X and is continuously closed (not illustrated) in the longitudinal direction X. In the lateral direction Y or transverse direction Y, the round baler belt 1 has a particular width. The round baler belt 1 is configured in a comparatively flat manner in terms of height Z or thickness Z. The longitudinal direction X, the transverse direction Y and the height Z are each arranged perpendicularly to one another.

The round baler belt 1 has a core region 10 in the form of a reinforcing fabric 10. The reinforcing fabric 10 is arranged on a manufacturing drum and wound in a continuously closed manner. At the same time, the reinforcing fabric 10 is already cut to its final width. This can take place both by simply trimming the width of a single baler belt and by cutting the width of the carcass multiple times at the manufacturing plant prior to vulcanization (manufacturing trim). In order to be able to produce a plurality of, in this case two, round baler belts 1 simultaneously at a manufacturing plant, a plurality of continuously closed reinforcing fabrics 10 can be arranged alongside one another in the transverse direction Y (cf. FIG. 1).

Figure 2:
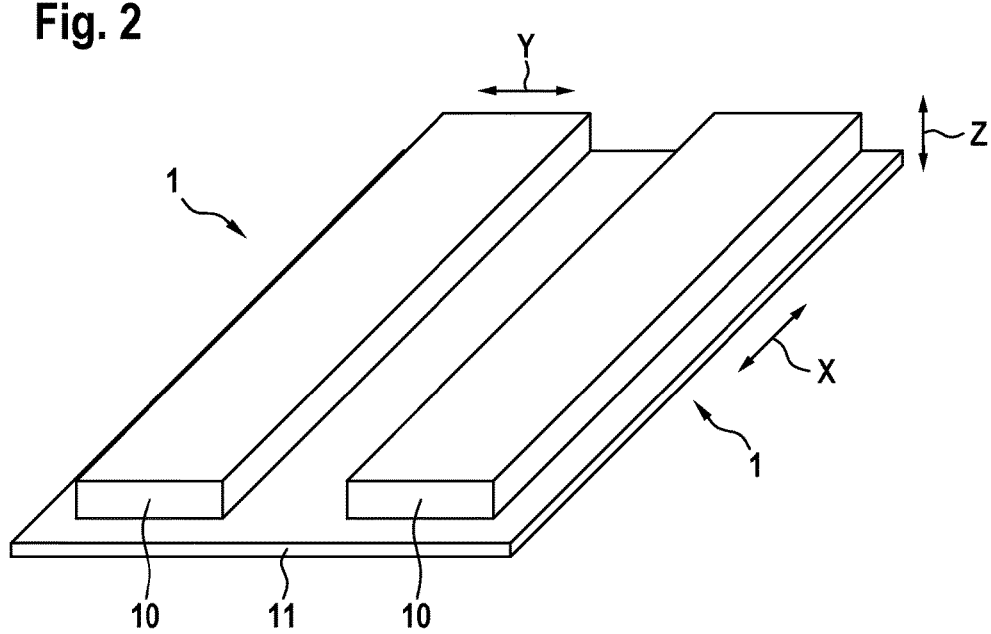
FIG. 2 shows a perspective schematic illustration of a continuously closed belt according to the disclosure in a second production step.

In a second method step, these reinforcing fabrics 10 are lined from below, i.e. from the inside, with an internal or running-side region made of elastomeric material (cf. FIG. 2). In a third method step, further elastomeric material, preferably in the form of material strips, is then applied to the upper, external side of the running-side region 11, laterally with respect to the two reinforcing fabrics 10 in the transverse direction Y, at the level of the reinforcing fabrics 10 (cf. FIG. 3). This elastomeric material forms first and second peripheral regions 13, 14 laterally with respect to the reinforcing fabrics 10.

In a fourth method step, an external or carrying-side region 12 is then applied to the reinforcing fabrics 10 or peripheral regions 13, 14 from above, such that the latter are covered over the entire width in the transverse direction Y (cf. FIG. 4). This arrangement is then vulcanized.

In a fifth method step, the two reinforcing fabrics 10 can be separated from one another in that cutting is carried out in the longitudinal direction X along the cutting lines 2 (cf. FIG. 5). As a result, straight outer edges of the round baler belts 1 are created laterally in the transverse direction Y (cf. FIG. 6). In order not to damage the two reinforcing fabrics 10 during cutting, the latter can be detected by means of ultrasound and the cutting lines 2 can be marked on the outer top side of the carrying-side region 12.

In this way, the running properties of a continuously wound belt 1 in the form of a round baler belt 1 can be used according to the invention and at the same time the lateral edges thereof can be protected by the two elastomeric peripheral regions 13, 14. It is also possible to avoid a situation in which the reinforcing fabric 10 can be damaged by the cutting to size and can protrude laterally out of the round baler belt 1 in the transverse direction Y. This can also improve the visual appearance of the round baler belt 1. The two elastomeric peripheral regions 13, 14 can also act as protection against wear for the lateral edges of the round baler belt 1.

LIST OF REFERENCE SIGNS (PART OF THE DESCRIPTION)

X Longitudinal direction
Y Transverse direction or lateral direction

Z Thickness or height
1 Continuously closed belt or round baler belt
10 Core region or reinforcing fabric
11 Internal or running-side region
12 External or carrying-side region
13 First peripheral region
14 Second peripheral region
2 Cutting line

We claim:

1. A belt comprising an internal region, an external region, a core region arranged between the internal region and the external region, and at least one peripheral region arranged transversely to longitudinal direction of belt, wherein the peripheral region is arranged partially between the internal region and the external region, wherein the the belt is continuously closed in the longitudinal direction, and wherein core region is continuously wound without interruption in the longitudinal direction.

2. The belt according to claim 1, wherein the at least one peripheral region is two peripheral regions located opposite one another transversely to the longitudinal direction.

3. The belt according to claim 1, wherein the core region comprises a reinforcing fabric.

4. The belt according to claim 1, wherein the internal region and/or the external region and/or a peripheral region and/or both peripheral regions comprise an elastomeric material.

5. The belt according to claim 1, wherein the belt is a round baler belt.

6. A round baler belt comprising an internal region, an external region, a core region arranged between the internal region and the external region, and two peripheral regions located opposite one another and arranged transversely to longitudinal direction of the round baler belt, wherein the peripheral region is arranged partially between the internal region and the external region, wherein the round baler belt is continuously closed in the longitudinal direction, and wherein core region is continuously wound without interruption in the longitudinal direction.

7. The round baler belt according to claim 6, wherein the core region comprises a reinforcing fabric.

8. The round baler belt according to claim 6, wherein the internal region and/or the external region and/or a peripheral region and/or both peripheral regions comprise an elastomeric material.

9. A method for producing a plurality of belts which are continuously closed in a longitudinal direction, the method comprising:
    producing a plurality of continuously closed core regions;
    arranging an internal region against the plurality of continuously closed core regions from the inside, the internal region protruding beyond the plurality of continuously closed core regions transversely to the longitudinal direction;
    arranging peripheral regions laterally adjacent the plurality of continuously closed core regions transversely to the longitudinal direction;
    arranging an external region on the plurality of continuously closed core regions from the outside, the external region protruding beyond the plurality of continuously closed core regions transversely to the longitudinal direction; and,
    cutting at least one peripheral region in the longitudinal direction X to provide a plurality of belts;
wherein the peripheral regions are arranged partially between the internal region and the external region.

10. The method according to claim 9 further comprising vulcanizing the plurality of belts.

11. The method according to claim 9 further comprising separating at least one peripheral region and/or the internal region and/or the external region in the direction of the thickness (Z) of the belt, such that the at least one peripheral region terminates flush with the internal region and/or with the external region transversely to the longitudinal direction.

12. The method according to claim 9, wherein the peripheral regions are three peripheral regions located adjacent one another transversely to the longitudinal direction.

13. The method according to claim 9, wherein the plurality of continuously closed core regions are continuously wound without interruption in the longitudinal direction.

14. The method according to claim 9, wherein the plurality of continuously closed core regions comprise a reinforcing fabric.

15. The method according to claim 9, wherein the internal region and/or the external region and/or a peripheral region and/or the peripheral regions comprise an elastomeric material.

16. The method according to claim 9, wherein the plurality of belts are round baler belts.

* * * * *